US012420299B2

(12) United States Patent
Chan et al.

(10) Patent No.: US 12,420,299 B2
(45) Date of Patent: Sep. 23, 2025

(54) UPSIDE-DOWN SPRAYER WITH AN AUXILIARY AIR CONDUCTING DEVICE FOR LIQUID PUMPING

(71) Applicant: LIVING FOUNTAIN PLASTIC INDUSTRIAL CO., LTD., Taichung (TW)

(72) Inventors: Ching-Chung Chan, Taichung (TW); Chun-Ho Chu, Taichung (TW)

( * ) Notice: Subject to any disclaimer, the term of this patent is extended or adjusted under 35 U.S.C. 154(b) by 287 days.

(21) Appl. No.: 18/449,362

(22) Filed: Aug. 14, 2023

(65) Prior Publication Data

US 2024/0116068 A1 Apr. 11, 2024

(30) Foreign Application Priority Data

Oct. 6, 2022 (TW) ................................ 111210939

(51) Int. Cl.
*B05B 11/10* (2023.01)

(52) U.S. Cl.
CPC ...... *B05B 11/1061* (2023.01); *B05B 11/1009* (2023.01); *B05B 11/1057* (2023.01)

(58) Field of Classification Search
CPC ............. B05B 11/1061; B05B 11/1057; B05B 11/1009; B05B 11/0044; B05B 11/1011; B05B 11/0059
See application file for complete search history.

(56) References Cited

U.S. PATENT DOCUMENTS 5,462,209 A * 10/1995 Foster ................. B05B 11/0075 222/376
5,467,901 A * 11/1995 Foster ................. B05B 11/1011 222/376

FOREIGN PATENT DOCUMENTS

JP H11349030 A1 * 12/1999

* cited by examiner

*Primary Examiner* — Steven M Cernoch
(74) *Attorney, Agent, or Firm* — Egbert, McDaniel & Swartz, PLLC

(57) ABSTRACT

Disclosed is an upside-down sprayer with an auxiliary air conducting device for liquid pumping, including a container, a nozzle, and a dip tube equipped with a switching valve near its upper end, which has a valve casing, a valve ball, and an inverted liquid pumping port. An auxiliary air conducting device is disposed adjacent to the switching valve and includes a connection part, a guide seat, and a projecting tube with an opening, wherein the connection part is positioned on the dip tube, the guide seat has a groove, and the projecting tube communicates with the groove. The opening of the projecting tube is offset in the direction of the inverted liquid pumping port, and the height of the opening is not lower than the height of the inverted liquid pumping port when used inverted.

8 Claims, 6 Drawing Sheets

UPSIDE-DOWN SPRAYER WITH AN AUXILIARY AIR CONDUCTING DEVICE FOR LIQUID PUMPING

CROSS-REFERENCE TO RELATED U.S. APPLICATIONS

Not applicable.

BACKGROUND OF THE INVENTION

1. Field of the Invention

The present invention relates to an auxiliary structure of a sprayer, in particular to an innovative structure revealing an upside-down sprayer with an auxiliary air conducting device for liquid pumping, as disclosed herein.

2. Description of Related Art Including Information Disclosed Under 37 CFR 1.97 and 37 CFR 1.98

With the sprayer introduced in the early days, the user can only operate the sprayer in an upright position so that the liquid can be properly pumped out of the water container. When the sprayer is inverted, the liquid level is inverted below the end of the dip tube, resulting in a problem that the liquid cannot be pumped out.

In response to the above problems and needs, the relevant industry has subsequently developed an inverted liquid sprayer structure. Briefly, the method is to add a switching valve to the dip tube of the sprayer near its upper end, which is closed when the sprayer is used in an upright position and opened when it is used in an inverted position, to form an inlet port into which the liquid can be smoothly introduced from the container, and then to achieve the function of being able to dispense liquid in an inverted position.

However, in the actual use of the conventional upside-down sprayer structure described above, the following problems have been found: in the inverted state, when the sprayer is pumping and sucking up the liquid, external air will be conducted into the water container through a preset air orifice in the nozzle to equalize the pressure inside the water container, and during this process, some air bubbles will then rise in the liquid inside the water container. As a result, the inlet port of the switching valve tends to introduce the above-mentioned air bubbles during the process of water introduction, resulting in a state of air bubbles accompanying the liquid emission, thus causing unstable flow rates in dispensing or even dispensing interruption.

BRIEF SUMMARY OF THE INVENTION

The main purpose of the present invention is to provide an upside-down sprayer with an auxiliary air conducting device for liquid pumping. The technical problem it seeks to solve is to make a breakthrough in innovation by aiming to develop a new type of sprayer structure with an auxiliary air conducting device for liquid pumping that is more desirable and industrially applicable.

In view of the foregoing purposes, the present invention provides an upside-down sprayer with an auxiliary air conducting device for liquid pumping, wherein an auxiliary air conducting device is provided in an upside-down sprayer structure. The upside-down sprayer mainly comprises a container, a nozzle, and a dip tube, wherein the nozzle is assembled to the container by means of a locking cap. The nozzle has an outlet passageway and a check valve disposed at a location of the outlet passageway, and the nozzle has a negative pressure suction chamber communicating with the outlet passageway by means of a flow-through orifice and also communicating with the inside of the locking cap by means of an air orifice. The dip tube has an upper end and a lower end. The upper end is connected to the outlet passageway and the lower end extending into the container, and the dip tube is equipped with a switching valve adjacent to the upper end comprising a valve casing, a valve ball, and an inverted liquid pumping port formed in the valve casing. The upside-down sprayer can be operated in either the upright or inverted mode. The auxiliary air conducting device is disposed adjacent to the switching valve of the dip tube, comprising a connection part, a guide seat, and a projecting tube with an opening, wherein the connection part being used for connecting and positioning on the dip tube, a groove being provided on the upper surface of the guide seat in a spaced and corresponding relationship with the air orifice of the negative pressure suction chamber, and the projecting tube being projected on the lower surface of the guide seat and being communicated with the groove. The opening of the projecting tube shall be offset in the direction of the inverted liquid pumping port of the switching valve, and the height of the opening shall be not lower than the height of the inverted liquid pumping port when used in the inverted mode.

With this innovative structure and technical feature, the present invention, compared with the prior art, when the upside-down sprayer is operated in an inverted mode, can effectively guide the air bubbles to be avoided and diverted from the inverted liquid pumping port by the feature of the auxiliary air conducting device to prevent air bubbles from being sucked into the inverted liquid pumping port, thereby greatly improving the quality problems such as unstable dispensing and interruptions, which indeed contains an inventive step and better industrial benefits.

A further purpose of the present invention is to achieve the advantage of a more secure limitation of the state of the auxiliary air conducting device in accordance with industrial applicability and inventive step using a further technical feature of a male/female snap-in component formed on one side of the guide seat in correspondence with the locking cap of the nozzle.

DETAILED DESCRIPTION OF THE INVENTION

Reference is made to FIGS. 1 through 6 for a preferred embodiment of an upside-down sprayer with an auxiliary air conducting device for liquid pumping of the present invention. However, the embodiment is for illustrative purposes only and is not subject to the limitation of the structure in a patent application.

Figure 6:
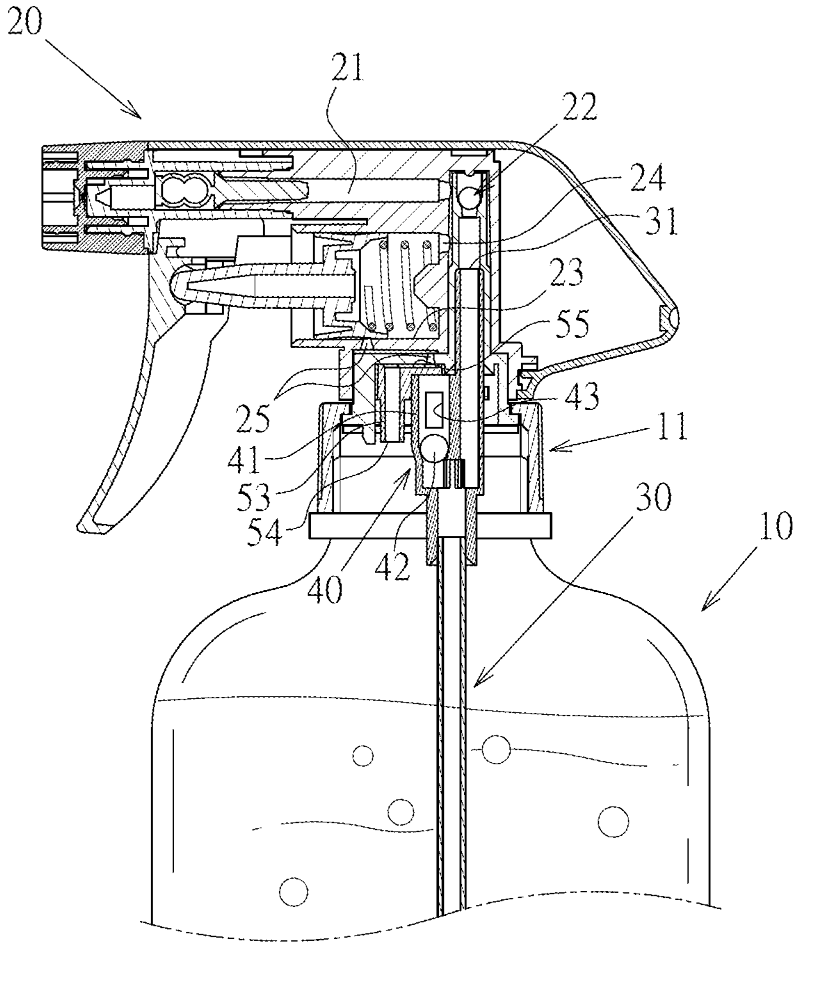
FIG. 6 is a 6-6 sectional view of FIG. 5.
Figure 7:
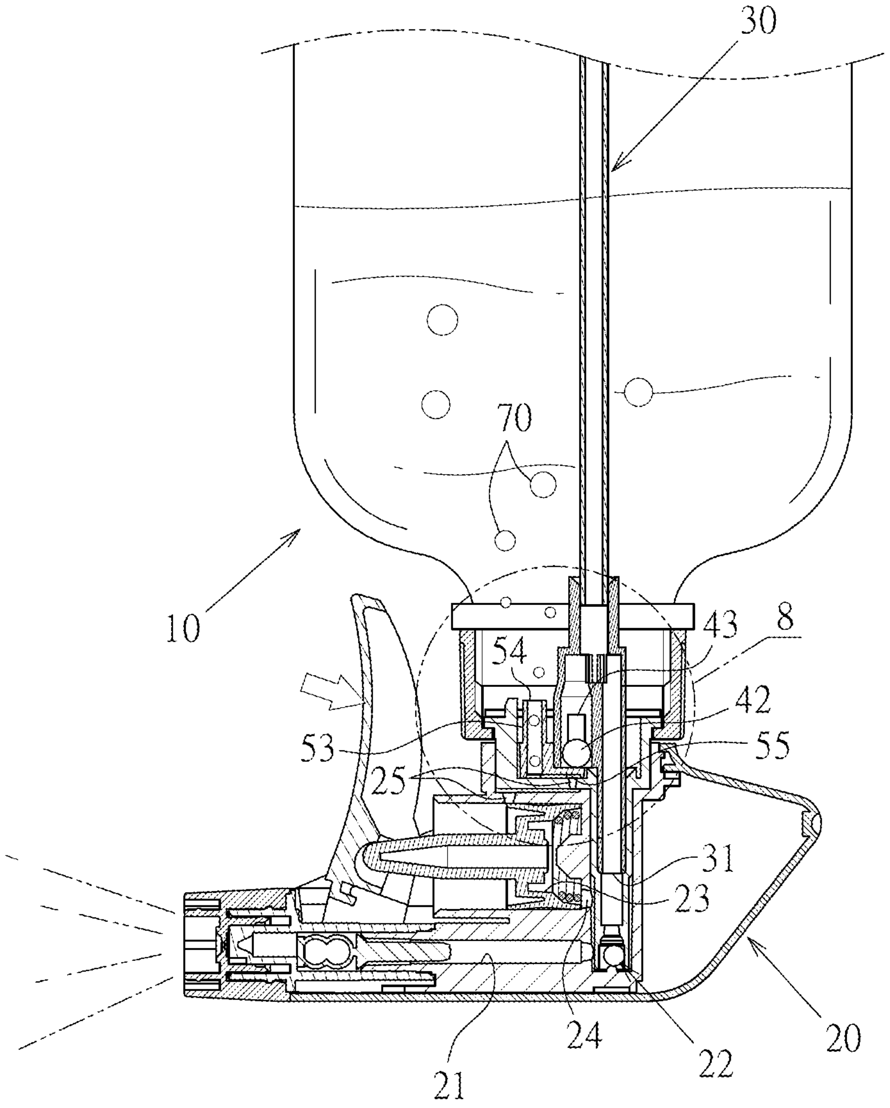
FIG. 7 is a cross-sectional view of the preferred embodiment of the present invention in an inverted mode of operation.
Figure 8:
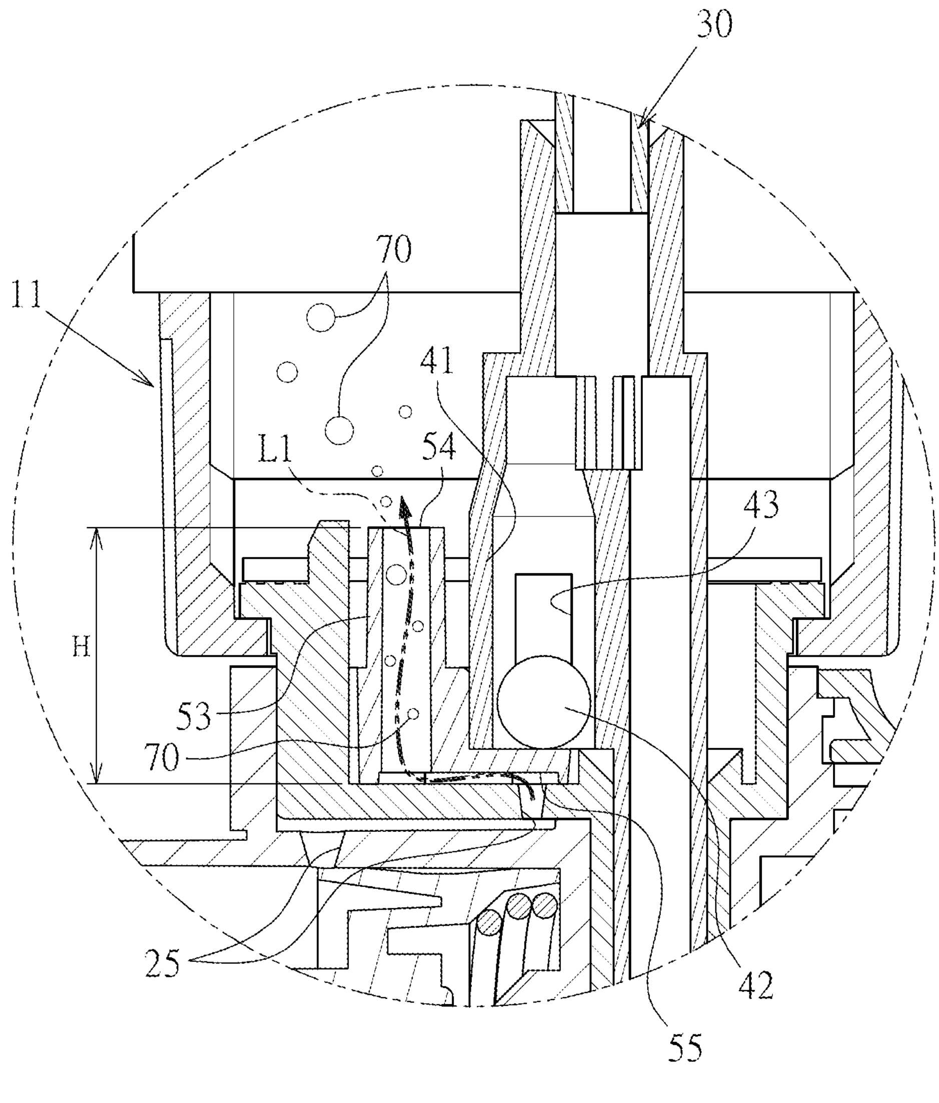
FIG. 8 is a partially enlarged view of FIG. 7.

An auxiliary air conducting device 50 is provided in an upside-down sprayer structure, which mainly comprises a container 10, a nozzle 20, and a dip tube 30, wherein the nozzle 20 is assembled to the container 10 by means of a locking cap 11. The nozzle 20 has an outlet passageway 21 and a check valve 22 disposed at a location of the outlet passageway 21, and the nozzle has a negative pressure suction chamber 23 communicating with the outlet passageway 21 by means of a flow-through orifice 24 and also communicating with the inside of the locking cap 11 by means of an air orifice 25. The dip tube 30 has an upper end 31 and a lower end 32, the upper end 31 being connected to the outlet passageway 21 and the lower end 32 extending into the container 10. The dip tube 30 is equipped with a switching valve 40 adjacent to the upper end 31 comprising a valve casing 41, a valve ball 42, and more than one inverted liquid pumping port 43 formed in the valve casing. The upside-down sprayer can be operated in either the upright mode (as shown in FIG. 6) or inverted mode (as shown in FIG. 7). The auxiliary air conducting device 50 is disposed adjacent to the switching valve 40 of the dip tube 30, comprising a connection part 51, a guide seat 52, and a projecting tube 53 with an opening 54, wherein the connection part 51 being used for connecting and positioning on the dip tube 30, and a groove 55 being provided on the upper surface of the guide seat 52 in a spaced and corresponding relationship with the air orifice 25 of the negative pressure suction chamber 23, and the projecting tube 53 being projected on the lower surface of the guide seat 52 and being communicated with the groove 55. The opening 54 of the projecting tube 53 shall be offset in the direction of the inverted liquid pumping port 43 of the switching valve 40, and the height H of the opening 54 (only those indicated in FIG. 8) shall be not lower than (i.e., including equal to or higher than) the height of the inverted liquid pumping port 43 when used in the inverted mode.

Figure 1:
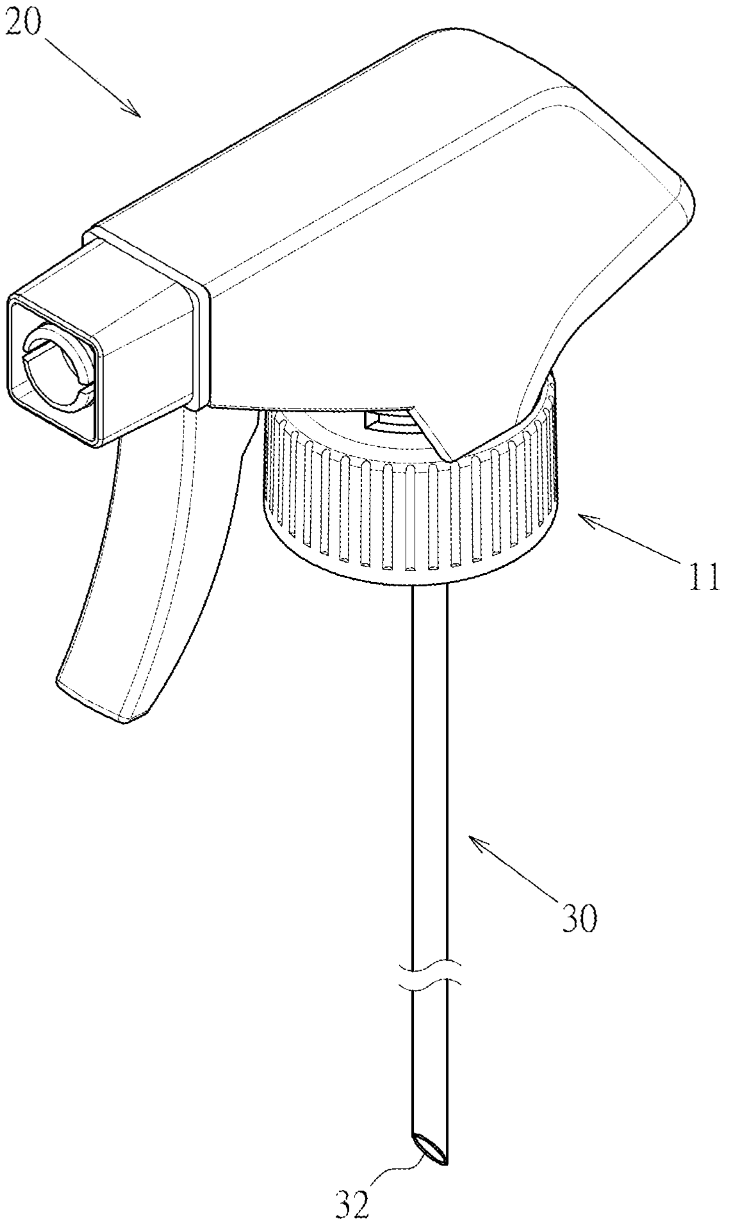
FIG. 1 is an assembled three-dimensional view of the major components of a preferred embodiment of the present invention.
Figure 2:
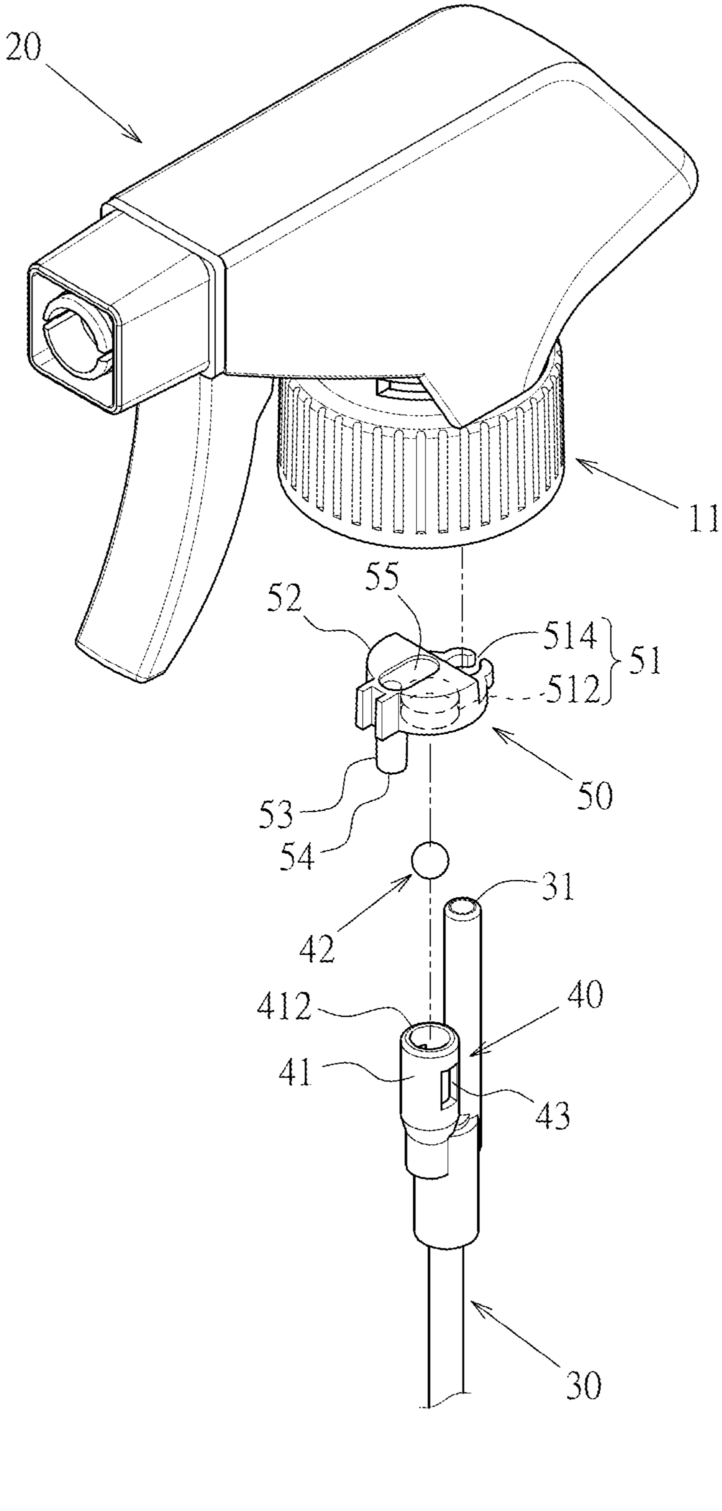
FIG. 2 is a disassembled three-dimensional view of the major components of the preferred embodiment of the present invention.
Figure 3:
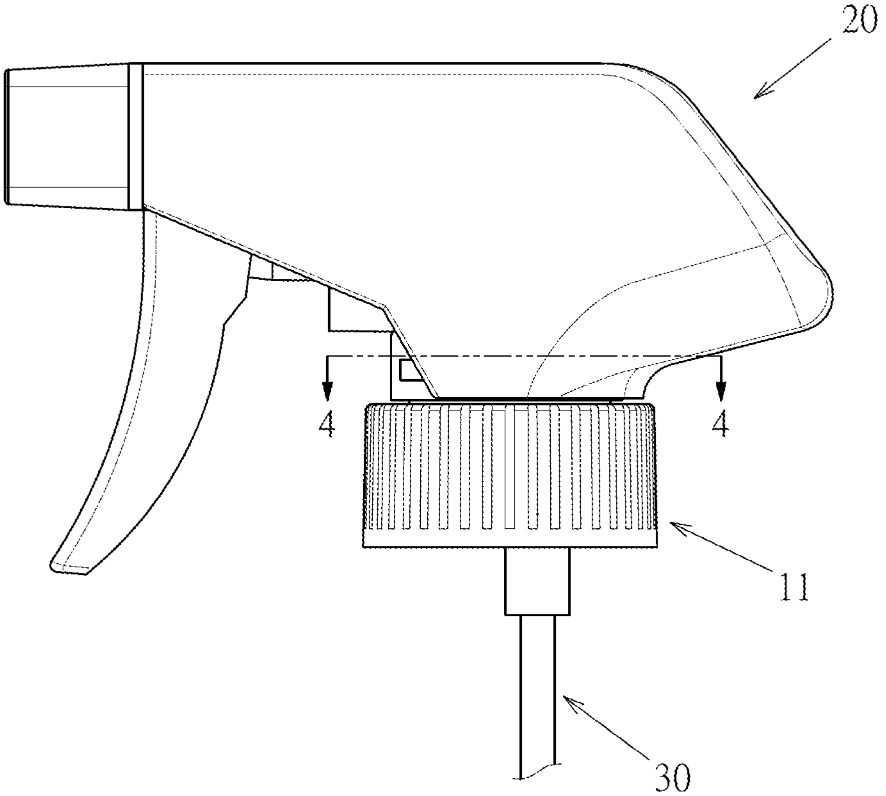
FIG. 3 is a side view of the partial components of the preferred embodiment of the present invention.

As shown in FIG. 2, in this embodiment, the connection part 51 of the auxiliary air conducting device 50 and the dip tube 30 are in an assembled and detachable configuration. Wherein, the connection part 51 comprises a socket 512 formed on the lower surface of the guide seat 52 to allow a projecting pipe 412 formed at the top of the valve casing 41 of the switching valve 40 to be fitted into the socket 512 for positioning. Further, the connection part 51 also comprises a clamper 514 formed on one side of the guide seat 52 to be clamped to the dip tube 30 adjacent to its upper end 31.

An integral type of connection (which is omitted from the drawings in this embodiment) is provided between the connection part of the auxiliary air conducting device and the dip tube.

Figure 4:
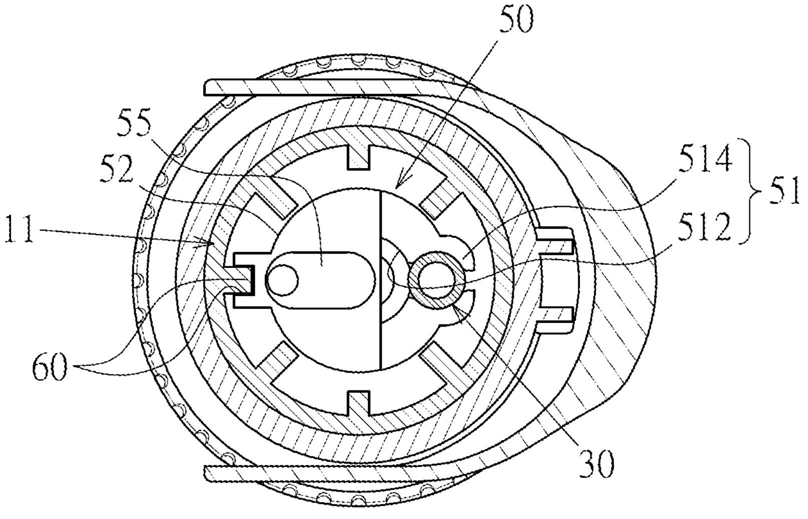
FIG. 4 is a 4-4 sectional view of FIG. 3.
Figure 5:
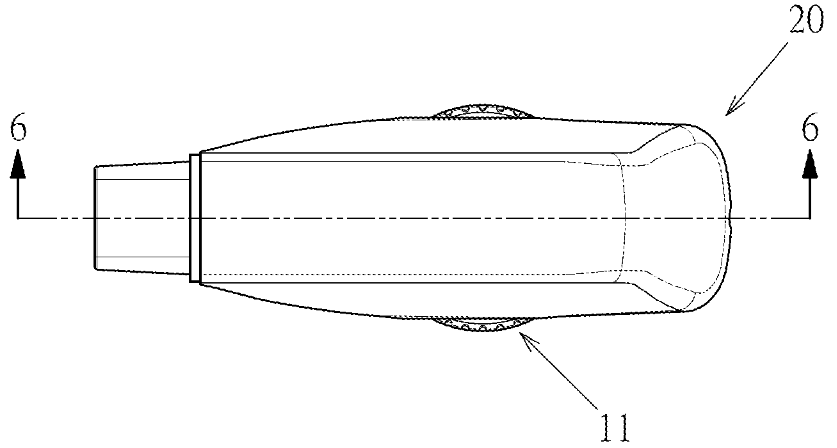
FIG. 5 is a top view of the partial components of the preferred embodiment of the present invention.

As shown in FIG. 4, in this embodiment, a male/female snap-in component 60 is further formed on one side of the guide seat 52 in correspondence with the locking cap 11 of the nozzle 20 to more securely limit the state of the auxiliary air conducting device 50 (referring to a directional anti-rotation effect).

With the above structural configuration and technical features, the operation of the upside-down sprayer disclosed in the present invention is described as follows: as shown in FIG. 6, the upside-down sprayer is operated in an upright mode of operation, and the operation is generally the same as that of a general sprayer, which will not be described in detail. As shown in FIG. 7 for the inverted mode of operation of the present invention; as the present invention is equipped with the auxiliary air conducting device 50, a groove 55 is provided on the upper surface of the guide seat 52 in the spaced and corresponding relationship with the air orifice 25 of the negative pressure suction chamber 23, and the projecting tube 53 is projected on the lower surface of the guide seat 52 and communicated with the groove 55. The opening 54 of the projecting tube 53 is offset in the direction of the inverted liquid pumping port 43 of the switching valve 40, and the height H of the opening 54 (only those indicated in FIG. 8) is not lower than (i.e., including equal to or higher than) the height of the inverted liquid pumping port 43 when used in the inverted mode. Thereby, when air bubbles 70 are produced by the air orifice 25 of the negative pressure suction chamber 23 of introducing the external air into the locking cap 11, the air bubbles 70 will be conducted by the groove 55 of the guide seat 52 of the auxiliary air conducting device 50 to the projecting tube 53 (as shown by the arrow L1 in FIG. 8) and then discharged into the container 10 through the opening 54. In this way, the air bubbles 70 can be effectively avoided and diverted from the inverted liquid pumping port 43 to prevent the air bubbles 70 from being sucked into the inverted liquid pumping port 43 and mixed with the liquid therein, thereby greatly improving the quality problems such as unstable dispensing and interruptions.

We claim:

1. An upside-down sprayer with an auxiliary air conducting device for liquid pumping, wherein an auxiliary air conducting device is provided in an upside-down sprayer structure, which comprises a container, a nozzle, and a dip tube, wherein the nozzle is assembled to the container by means of a locking cap, the nozzle has an outlet passageway and a check valve disposed at a location of the outlet passageway, and the nozzle has a negative pressure suction chamber communicating with the outlet passageway by means of a flow-through orifice and also communicating with the inside of the locking cap by means of an air orifice; the dip tube has an upper end and a lower end, the upper end being connected to the outlet passageway and the lower end extending into the container, and the dip tube is equipped with a switching valve adjacent to the upper end comprising a valve casing, a valve ball, and more than one inverted liquid pumping port formed in the valve casing; wherein the upside-down sprayer can be operated in either an upright mode or an inverted mode; the auxiliary air conducting device is disposed adjacent to the switching valve of the dip tube, comprising a connection part, a guide seat, and a projecting tube with an opening, wherein the connection part being used for connecting and positioning on the dip tube, a groove being provided on an upper surface of the guide seat in a spaced and corresponding relationship with the air orifice of the negative pressure suction chamber, and the projecting tube being projected on a lower surface of the guide seat and being communicated with the groove; the opening of the projecting tube is offset in a direction of the more than one inverted liquid pumping ports of the switching valve, and a height of the opening is not lower than a height of the more than one inverted liquid pumping ports when used in the inverted mode.

2. The upside-down sprayer with an auxiliary air conducting device for liquid pumping according to claim 1, wherein the connection part of the auxiliary air conducting device and the dip tube are in an assembled and detachable configuration.

3. The upside-down sprayer with an auxiliary air conducting device for liquid pumping according to claim 2, wherein the connection part comprises a socket formed on the lower surface of the guide seat to allow a projecting pipe formed at a top of the valve casing of the switching valve to be fitted into the socket for positioning.

4. The upside-down sprayer with an auxiliary air conducting device for liquid pumping according to claim 2, wherein the connection part also comprises a clamper formed on one side of the guide seat to be clamped to the dip tube adjacent to an upper end of the dip tube.

5. The upside-down sprayer with an auxiliary air conducting device for liquid pumping according to claim 3, wherein the connection part also comprises a clamper formed on one side of the guide seat to be clamped to the dip tube adjacent to an upper end of the dip tube.

6. The upside-down sprayer with an auxiliary air conducting device for liquid pumping according to claim 1, wherein an integral type of connection is provided between connection part of the auxiliary air conducting device and the dip tube.

7. The upside-down sprayer with an auxiliary air conducting device for liquid pumping according to claim 2, wherein a male/female snap-in component is further formed on one side of the guide seat in correspondence with the locking cap of the nozzle to more securely limit a state of the auxiliary air conducting device.

8. The upside-down sprayer with an auxiliary air conducting device for liquid pumping according to claim 6, wherein a male/female snap-in component is further formed on one side of the guide seat in correspondence with the locking cap of the nozzle to more securely limit a state of the auxiliary air conducting device.

* * * * *